Figure 4A:
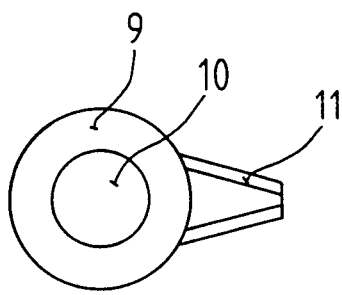
Figure 4B:
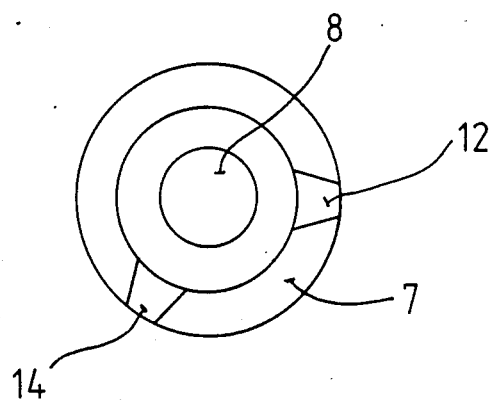

United States Patent [19]

Schneider et al.

[11] Patent Number: 4,706,813
[45] Date of Patent: Nov. 17, 1987

[54] CUBOID CONTAINER FOR ARTICLES AND HINGE AND PIVOT-LIMITING MEANS THEREFOR

[75] Inventors: Alfred Schneider, Hoehnheim, France; Joachim Eberhard, Kippenheim, Fed. Rep. of Germany

[73] Assignee: BASF Aktiengesellschaft, Fed. Rep. of Germany

[21] Appl. No.: 3,660

[22] Filed: Jan. 15, 1987

[30] Foreign Application Priority Data

Jan. 18, 1986 [DE] Fed. Rep. of Germany ... 8601147[U]

[51] Int. Cl.$^4$ ...................... B65D 85/67; B65D 51/04
[52] U.S. Cl. .................................. 206/387; 220/335; 220/338; 220/343
[58] Field of Search ............... 206/387; 220/334, 335, 220/337, 338, 343

[56] References Cited

U.S. PATENT DOCUMENTS

| | | | |
|---|---|---|---|
| Re. 31,086 | 11/1982 | Johnson, Jr. et al. | 220/337 |
| 3,212,125 | 10/1965 | Hussell | 220/343 X |
| 4,378,066 | 3/1983 | Sato et al. | 206/387 |
| 4,540,090 | 9/1985 | Gelardi et al. | 206/387 |
| 4,658,981 | 4/1987 | Goto et al. | 206/387 X |

FOREIGN PATENT DOCUMENTS

| | | |
|---|---|---|
| 8510858 | 7/1985 | Fed. Rep. of Germany . |
| 7834754 | 9/1986 | Fed. Rep. of Germany . |
| 1357512 | 6/1974 | United Kingdom . |

Primary Examiner—William Price
Attorney, Agent, or Firm—Keil & Weinkauf

[57] ABSTRACT

A cuboid container is designed with hinging and pivot-limiting devices which consist of hinge pins, hinge holes and recesses and projections and webs and grooves which fit the latter. The shapes and numbers of the elements are selected so that, in addition to greater ease of manufacture, a reliably functioning hinging and limiting device is achieved in several radial positions. The container is particularly suitable for use as a cassette container.

22 Claims, 9 Drawing Figures

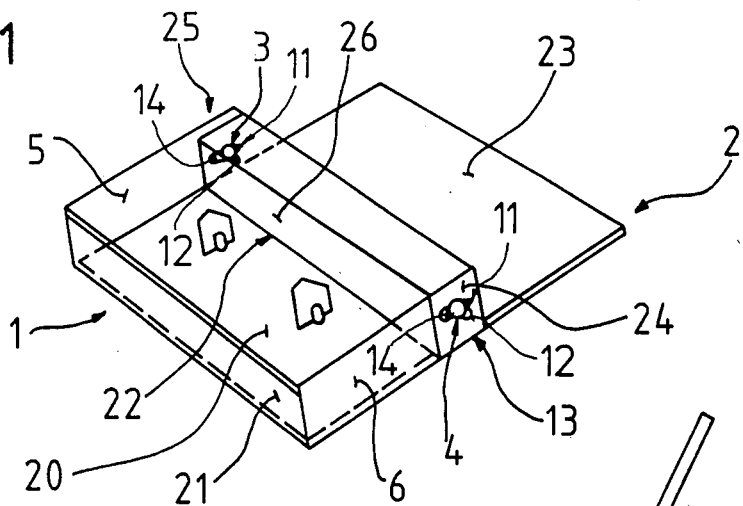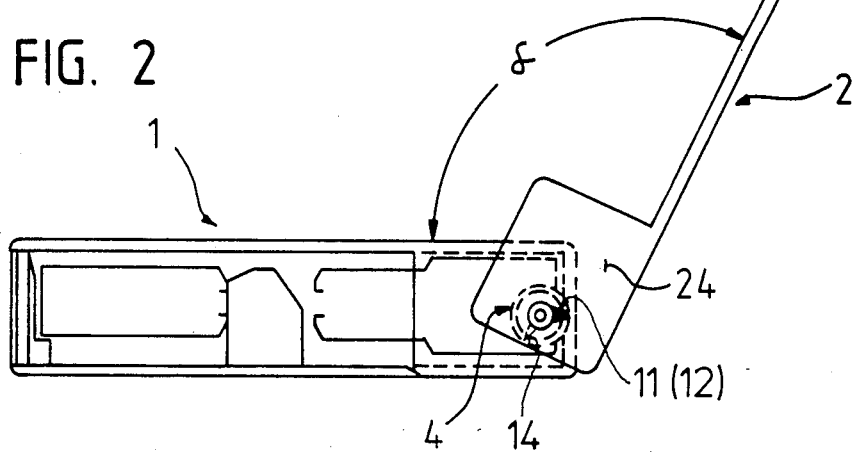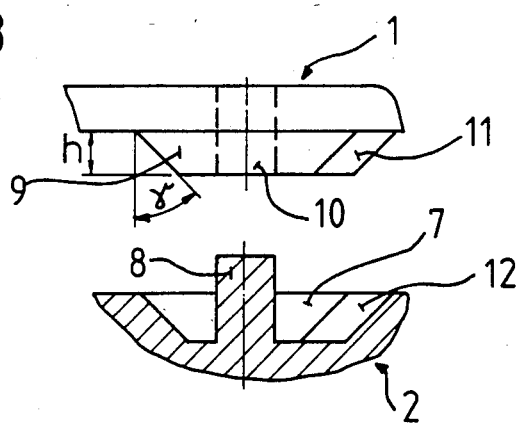

CUBOID CONTAINER FOR ARTICLES AND HINGE AND PIVOT-LIMITING MEANS THEREFOR

The present invention relates to a cuboid container for articles, particularly recording media, having a base part which possesses a rear wall, a base wall and side walls, and a lid part, which consists of at least one lid wall provided with lid side-wall parts which extend over some or all of the length of the sides of the lid wall, at least a slight pre-stress existing between the side walls of the lid part and of the base part, and hinging devices and pivot-limiting devices being provided on the side walls and to hinge and pivot-limiting means therefor.

German Published Application DAS No. 2,366,195 has disclosed a container for audio tape cassettes in which the lid part is designed with a receiving pocket for the cassette, and the base part is designed with a cut-out matching the front side of the pocket, so that a closed, box-shaped housing is formed in the closed position. The lid and base parts are connected by means of primitive peg-and-hole hinges, and projections on the lid part limit the opening pivoting movement of the lid at about 180°. Because of the flexibility of the free side walls of the base part, and the size of the projections, this pivoting movement of the practical container is limited only to a very restricted extent, since it is easily possible, even unintentionally, to overcome the effect of the projections, so that the cassette cannot effectively be prevented from falling out.

German Utility Model No. 7,834,754 discloses a pivoting container for two or more recording media, a boxshaped one in a card compartment on the lid and a cassette-shaped one in a separate tray on the base of the container. In this case the connection between base tray and lid consists of hinge side-pieces with recesses, provided on the lid, pivot stubs on the outsides of the side parts of the tray engaging into these. The angle of opening is limited at about 130° by the rear top edge of the lid abutting the front edge of the base.

German Laid-Open Application DOS No. 3,129,559 discloses a cassette container with peg-and-hole hinges and annular projections which do not overlap and which together produce an arc of less than 360°. After a predetermined pivoting travel, the ends of the annular sectors abut against each other, causing the pivoting to be limited when the container is open at, for example, an angle of 90°. German Utility Model No. 8,510,858 has disclosed a very similar apparatus for limiting the pivoting movement, with two oblique-surfaced annular steps.

The object of the present invention is to provide a container which has an improved hinging and pivotlimiting device, and such a hinging and pivot-limiting device.

We have found that this object is achieved, according to the invention, and that the cuboid container defined initially is provided with a hinging device which is designed as (a) a central hinge pin and a corresponding hole and
(b) an approximately circular projection and a corresponding recess,
(c) the hinge pin and projection and the hole and recess, respectively, being arranged concentrically to one another, and the pivot-limiting device being designed as a web which is substantially radial to the hinge pin and a groove which fits the web.

This very advantageous development of conventional hinging devices makes it possible, surprisingly, to produce a hinging and pivot-limiting device which is reliable in operation and simple to produce.

The invention becomes applicable to a container in which the base wall possesses a cut-out which is limited on two sides of base part side-walls and the lid part is provided with a pocket which fits into the outline of the cut-out and has pocket side walls, if hinging devices and pivot-limiting devices are provided between the side walls of the base part and the side walls of the pocket.

In an advantageous embodiment, the radial web is formed within the recess and the radial groove on the projection.

In a further embodiment the web and the corresponding groove are of prismatic shape and have, in particular, a trapezoidal cross-section, making for particularly simple manufacture.

In practice, it is advantageous if the projection has the shape of a truncated cone, and the oblique surface of the truncated cone forms an angle gamma of from about 30° to 60°, in particular 45°, with the surface of the side wall.

In a further embodiment, two webs can be provided in the recess and corresponding grooves on the projection, in order to form two positions at which the lid is engaged and limited.

In a further embodiment, the angle delta between the two webs and grooves respectively can be about 110°–130°, resulting in two corresponding engagement positions for the lid.

In a further advantageous embodiment, the web can be designed as a semi-cylinder and the groove as a hollow semi-cylinder.

Details of the invention are apparent from the exemplary embodiments which are described below and illustrated in the drawing.

In the drawing:

FIG. 1 shows a two-part cassette container with hinging and pivot-limiting devices according to the invention, FIG. 2 shows the cassette container of FIG. 1 in the open position FIGS. 3 and 4a to 4c show details of the hinging and pivot-limiting devices according to FIGS. 1 and 2, and FIGS. 5a–c show an alternative embodiment of a hinging and pivot-limiting device.

The container shown in FIG. 1 consists of a base part with a base wall 20, a rear wall 21 and side walls 5 and 6, and of a lid part 2 with a lid wall 23 and a pocket 13 which possesses the pocket side walls 24 and 25 and a pocket front wall 26. The hinging devices are given the reference numerals 3 and 4 and are provided on the insides of the free ends of the side walls 5 and 6 of the base part 1, and on the pocket side walls 24 and 25 of the lid part 2. Projections 9, preferably frustoconical in shape, are provided on the base part side walls 5 and 6, and recesses 7 of corresponding design are located on the outer pocket side walls 24 and 25. A cylindrical pin 8 is located in the middle of the recess 7, and an appropriate central hole 10 in the projection 9 corresponds to this pin. The height h of the projection 9 is selected so that the distance between the end faces of the two opposing projections 9 is less than that between the bases of the recesses 7, so that there is at least a slight pre-stressing force between the parts 1 and 2, which holds them together. When the two parts 1 and 2 are assembled, the pin 8 engages in the hole 10 and the positions of the base and lid parts are aligned. The projection 9 is additionally designed with a lug-like web 11 which starts at the periphery of the projection 9 and extends outwards in a substantially radial direction. One or more detent grooves 12, substantially corresponding in shape to the web 11, are provided on the periphery of the recess 7, so that one or more detent positions are produced of the lid part 2 relative to the base part 1.

Figure 4C:
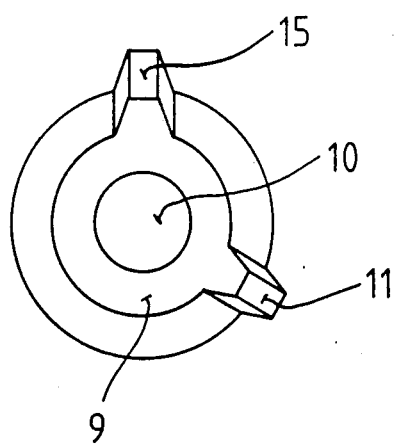

Embodiments of the invention are shown in FIGS. 1 and 2. In FIG. 1 the web 11 is not engaged with either of two detent grooves 12. In FIG. 2 the web 11 is located in a detent groove 12, the web 11 and detent groove 12 being so arranged relative to one another that the lid part 2 is locked at an opening position of about alpha=120°. In FIGS. 1 and 2 a further detent groove 14 is provided in each case for locking in the closed position, this groove being about 180° (FIG. 1) or about 120° (FIG. 2) away from the particular position of the lid part shown, in the direction of rotation of the lid part 2. In order to obtain more than two detent positions, it is merely necessary to provide the appropriate additional detent grooves on the recess 7 of the lid part 2. If, as shown in FIG. 4c, a second web 15 is also provided on the projection 9 of the lid part 1, and is arranged at an angle relative to the web 11, it is possible to produce both double locking positions and a correspondingly increased number of detent positions.

Figure 5A:
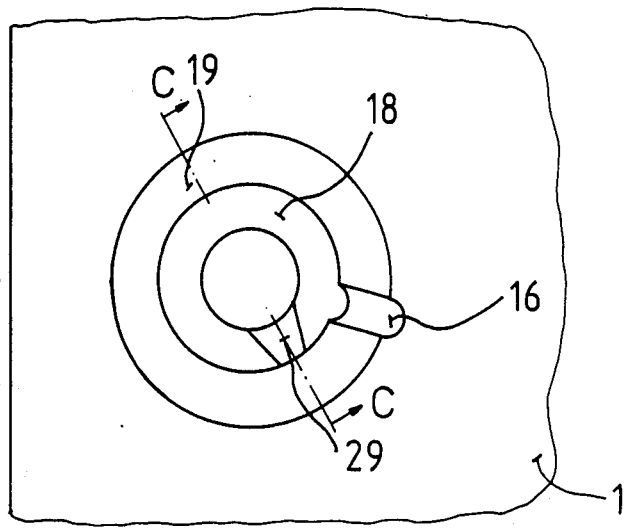
Figure 5B:
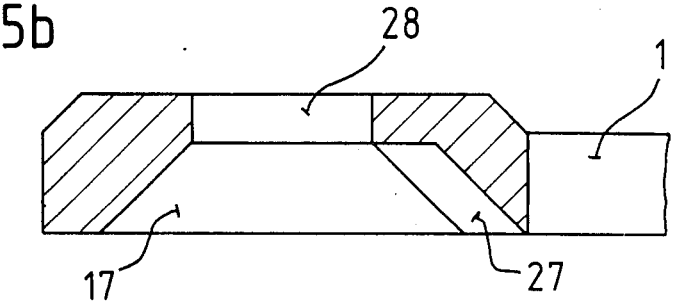
Figure 5C:
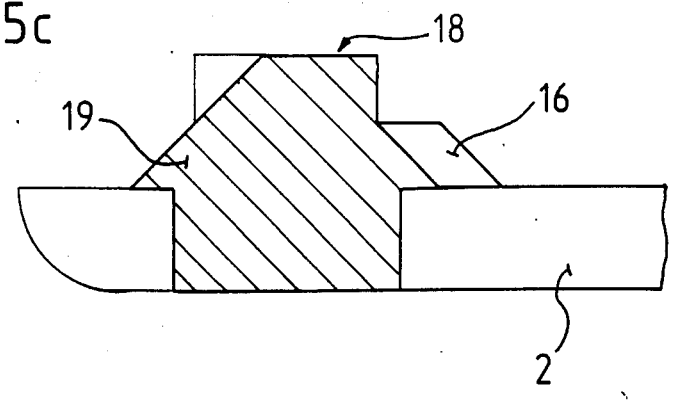

FIG. 5 shows an alternative embodiment of the invention, a pin 18 being provided on the projection 19 of the lid part 1 and a corresponding recess 17 being formed, in this case in the base part 2. The pin 18 is provided with a flattened area 29 which serves to increase the ease of assembly and/or to produce a greater pre-stress. A hole 28 is assigned to the pin 18. The web 16 is designed as a semi-cylinder (FIG. 5a), and the groove 27 is correspondingly designed as a groove in the form of a hollow semi-cylinder. FIG. 5c is a section through the lid part 1 along the line of section c-c′ in FIG. 5a.

Of course, the web 16, like the web 11, can be prismatic in shape, and in particular can have a trapezoidal cross-section. Similarly, it is possible for the projection 9, 19 and the recess 7, 17 to have other body shapes and trough shapes, respectively, which are circular in plan view, such as a spherical cap or a parabolic or hyperbolic shape, etc. Each of these three-dimensional shapes ensures that there will be no problems in assembling the base and lid parts 1 and 2, respectively, or in achieving proper functioning of the hinging devices 3 and 4 and the pivot-limiting devices. It is not important which part of the hinging and pivot-limiting devices is provided on which part, base part or lid part, provided that they engage each other in the novel manner described above.

The hinging/pivot-limiting devices described are not restricted to application to containers. It will also be entirely possible to apply them to cassettes with movably connected front flaps etc.

We claim:

1. Cuboid container for articles, particularly recording media, having a base part which possesses a rear wall, a base wall and side walls, and a lid part which consists of at least one lid wall provided with lid sidewall parts which extend over at least some of the length of the sides of the lid wall, at least a slight pre-stress existing between the side walls of the lid part and of the base part, and hinging devices and pivot-limiting devices being provided on the side walls, wherein each hinging device is designed as
    (a) a central hinge pin and a corresponding hole and
    (b) an approximately circular projection and a corresponding recess,
    (c) the hinge pin and projection and the hole and recess, respectively, being arranged concentrically to one another,
    and the pivot-limiting device being designed as at least one web which is substantially radial to the hinge pin and groove which fits the said web.

2. Container as claimed in claim 1, wherein the at least one radial web is formed inside the recess and the radial groove is formed on the projection.

3. Container as claimed in claim 1, wherein the at least one radial web and the groove on the side walls are of prismatic shape.

4. Container as claimed in claim 3, wherein the web and groove on the side walls are of a shape which has a trapezoidal cross-section.

5. Container as claimed in claim 1, wherein the projection has the shape of a truncated cone and the generated surface of the truncated cone forms an angle gamma of about 30°–60° with the surface of the side wall.

6. Container as claimed in claim 5, wherein the projection has the shape of a truncated cone whose generated surface forms an angle gamma of about 45° with the surface of the side wall.

7. Container as claimed in claim 1, wherein two radial webs are provided on the projection and corresponding grooves in the region of the recess.

8. Container as claimed in claim 7, wherein the angle delta between the two radial webs and groove is about 110°–130°.

9. Container as claimed in claim 1, wherein the at least one radial web is of semi-cylindrical shape and the groove is formed as a hollow semi-cylindrical.

10. Cuboid container for articles, particularly recording media, having a base part which possesses a rear wall, a base wall and side walls, and a lid part which consists of at least one lid wall provided with lid sidewall parts which extend over at least some of the length of the sides of the lid wall, the base wall possessing a cut-out which is limited on two sides by base part side walls and the lid part being provided with a pocket which fits into the contour line of the cut-out and has pocket side walls, at least a slight pre-stress existing between the side walls of the lid part and of the base part, and hinging devices and pivot-limiting devices being provided on the side walls, wherein each hinging device is designed as
    (a) a central hinge pin and a corresponding hole and
    (b) an approximately circular projection and a corresponding recess,
    (c) the hinge pin and projection and the hole and recess, respectively, being arranged concentrically to one another,
    and the pivot-limiting device being designed as at least one web which is substantially radial to the hinge pin and as a groove fitting the said web.

11. Container as claimed in claim 10, wherein the hinging devices and pivot-limiting devices are located between the side walls of the base part and those of the pocket.

12. Container as claimed in claim 10, wherein the at least one radial web is formed inside the recess and the radial groove on the projection.

13. Container as claimed in claim 10, wherein the at least one radial web and the groove on the side walls are of prismatic shape.

14. Container as claimed in claim 13, wherein the web and the groove on the side walls possess a shape of trapezoidal cross-section.

15. Container as claimed in claim 10, wherein the projection has the shape of a truncated cone whose surface of the truncated cone forms an angle gamma of about 30°–60° with the surface of the side wall.

16. Container as claimed in claim 15, wherein the projection generated surface forms an angle gamma of about 45° with the surface of the side wall.

17. Container as claimed in claim 10, wherein two radial webs are provided on the projection and corresponding grooves in the region of the recess.

18. Container as claimed in claim 17, wherein the angle delta between the two radial webs and grooves is about 110°–130°.

19. Container as claimed in claim 10, wherein the at least one radial web is of semi-cylindrical shape and the groove is formed as a hollow semi-cylinder.

20. Hinge and pivot-limiting device in particular for a cuboid container for recording media, said container having a base part which possesses a rear wall, a base wall and side walls, and a lid part which consists of at least one lid wall provided with lid sidewall parts which extend over at least some of the length of the sides of the lid wall, at least a slight pre-stress existing between the side walls of the lid part and of the base part, said hinge devices and pivot-limiting devices being provided on the side walls of the container, wherein said hinge device comprises
   (a) a central hinge pin and a corresponding hole and
   (b) an approximately circular projection and a corresponding recess,
   (c) the hinge pin and projection and the hole and recess, respectively, being arranged concentrically to one another, and
   said pivot-limiting device comprises at least one web which is substantially radial to the hinge pin and groove which fits the said web.

21. Device as claimed in claim 20, wherein the at least one radial web is formed inside the recess and the radial groove is formed on the projection.

22. Device as claimed in claim 20, wherein the projection has the shape of a truncated cone and the generated surface of the truncated cone forms an angle gamma of about 30°–60° with the surface of the side wall.

* * * * *